United States Patent Office 3,825,539
Patented July 23, 1974

3,825,539
4H[1]BENZOPYRANO[3,4-d]ISOXAZOLE
DERIVATIVES
Jules Freedman, Thiensville, Wis., assignor to Colgate-Palmolive Company, New York, N.Y.
No Drawing. Continuation-in-part of applications Ser. No. 670,772, Sept. 26, 1967, now Patent No. 3,553,228, and Ser. No. 67,603, Aug. 27, 1970, now Patent No. 3,692,796. This application Sept. 11, 1972, Ser. No. 288,117
Int. Cl. C07d 85/22
U.S. Cl. 260—247.5 R        1 Claim

ABSTRACT OF THE DISCLOSURE

The compounds are 4H[1]benzopyrano[3,4-d]isoxazole derivatives substituted in the 3-position which are useful as pharmaceutical agents, especially anti-inflammatory agents. They are also useful in preparing structurally related pharmaceutical compounds of known utility. In addition, they are useful as intermediates in the preparation of wood preservatives, mothproofing agents and pickling inhibitors.

RELATED CASES

This application is a continuation-in-part of my earlier application Ser. No. 670,772, filed Sept. 26, 1967, now U.S. Pat. No. 3,553,228, and my copending application, Ser. No. 67,603, filed Aug. 27, 1970, now U.S. Pat. No. 3,692,796.

DETAILED DESCRIPTION

The compounds of the present invention may be represented by the following formula

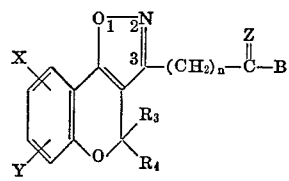

I in which X and Y are the same or different members selected from hydrogen, halo such as chloro, bromo or fluoro, lower alkyl of 1 to 4 carbon atoms such as methyl, ethyl or propyl, a lower alkoxy of 1 to 4 carbon atoms such as methoxy, ethoxy or propoxy and trifluoromethyl, Z is O or S, $n$ is 0 to 3, B is selected from $OR_1$,

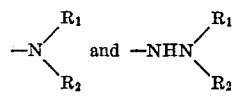

in which $R_1$ and $R_2$ are selected from hydrogen, a lower alkyl of 1 to 4 carbon atoms such as previously described, phenyl, a phenyl-lower alkyl of 7 to 13 carbon atoms such as benzyl, phenethyl and phenylisopropyl, including nuclear-substituted phenyl lower alkyls such as $p$-chlorobenzyl or $p$-methoxybenzyl, and groups in which $R_1$ and $R_2$ in

are joined together to form an cyclicamino group selected from morpholino, pyrrolidino, piperidino, 4-lower alkyl-1-piperazino such as 4-methyl-1-piperazino, N-phenyl-lower alkyl piperazino and N-hydroxy lower alkyl piperazino such as N-hydroxy-ethyl piperazino.

The compounds of the present invention may be conveniently prepared employing as the basic starting material a 4-chromanone of the formula

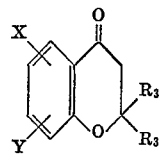

II in which $R_3$, X and Y are as previously defined.

The unsubstituted 4-chromonone is a known compound and the substituted compounds may be prepared as described in the literature [C. D. Hurd, et al., J. Am. Chem. Soc., 76, 5065 (1954) and S. Wawzonek, et al., J. Am. Chem. Soc. 76, 1080 (1954)].

Representative of the 4-chromanones which may be employed as starting materials are 4-chromanone,
6-methoxy-4-chromanone,
6-bromo-4-chromanone,
8-methyl-4-chromanone,
6-trifluoromethyl-4-chromanone,
2,2-dimethyl-4-chromanone,
6-chloro-4-chromanone,
2-phenyl-4-chromanone,
6-methyl-4-chromanone,
6,7-methylenedioxy-4-chromanone, and
6-chloro-2-phenyl-4-chromanone.

In the preferred method of preparation of the novel compounds, a 4-chromanone is treated with a lower alkyl oxalate such as ethyl oxalate, in the presence of a suitable base such as sodium amide, sodium methoxylate or sodium hydride, in an anhydrous reaction medium such as toluene or benzene, to form a lower alkyl 4-oxochroman-3-glyoxylate. The ring closure is then effected by treating the glyoxylate with hydroxylaminehydrochloride in ethanol under reflux conditions to form the lower alkyl 4H[1]benzopyrano[3,4-d]isoxazole-3-carboxylate.

The described process may be illustrated as follows:

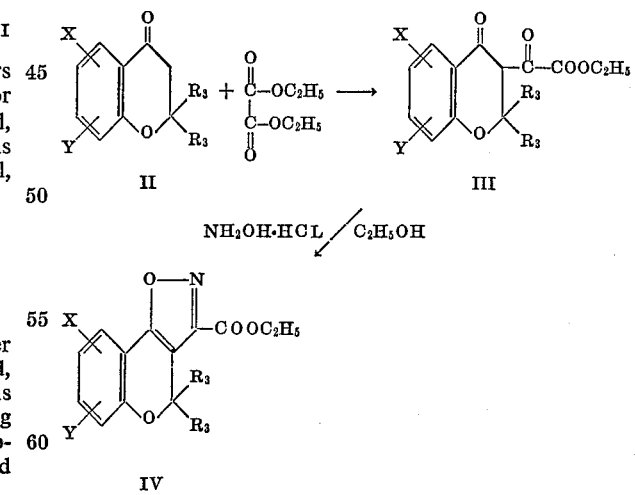

wherein $R_3$, X and Y are as previously defined and do not partake in or interfere with the reaction.

Representative of the compounds which may be prepared by the above processes are ethyl 4-oxochroman-3-glyoxylate,
ethyl 4H[1]benzopyrano[3,4-d]isoxazole-3-carboxylate,
ethyl 6-chloro-4-oxochroman-3-glyoxylate,
ethyl 6-methoxy-4-oxochroman-3-glyoxylate,
methyl 7-methyl-4-oxochroman-3-glyoxylate, methyl 8-methoxy-4H[1]benzopyrano[3,4-d]isoxazole-3-carboxylate, and
ethyl 8-chloro-4H[1]benzopyrano[3,4-d]isoxazole-3-carboxylate.

The lower alkyl 4H[1]benzopyrano[3,4-d]isoxazole-3-carboxylate (IV) may then be employed to prepare the corresponding amide, carboxhydrazide and carboxylic acid derivatives by application of conventional techniques which may be illustrated as follows:

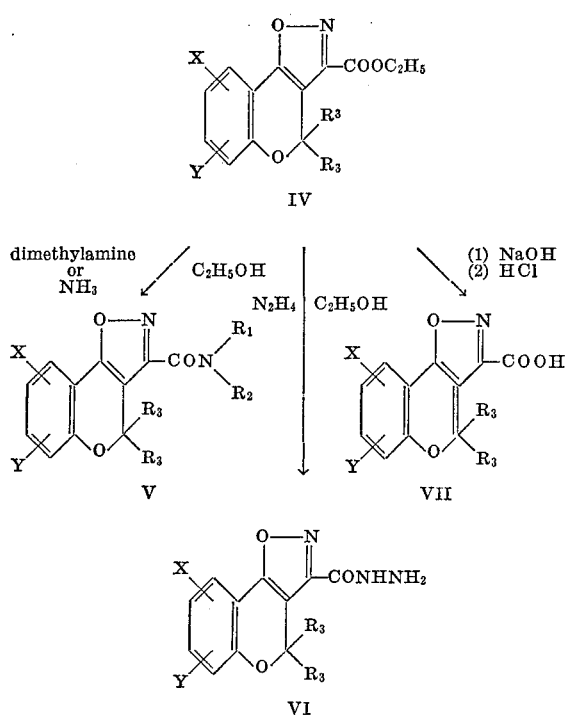

wherein $R_1$ and $R_2$ are both hydrogen or methyl, and $R_3$, X and Y are as previously defined and do not interfere with or partake in the reaction.

Representative of the compounds which may be prepared by the above processes are 4H[1]benzopyrano[3,4-d]isoxazole-3-carboxamide,
N,N-dimethyl-4H[1]benzopyrano[3,4-d]isoxazole-3-carboxamide,
N-methyl-7-methoxy-4H[1]benzopyrano[3,4-d]isoxazole-3-carboxamide,
N,N-dimethyl-8-trifluoromethyl-4H[1]benzopyrano[3,4-d]isoxazole-3-carboxamide,
N,N-dimethyl-8-chloro-4H[1]benzopyrano[3,4-d]isoxazole-3-carboxamide,
N-isopropyl-4H[1]benzopyrano[3,4-d]isoxazole-3-carboxamide,
N-methyl-8-chloro-4H[1]benzopyrano[3,4-d]isoxazole-3-carboxamide,
6-methoxy-4H[1]benzopyrano[3,4-d]isoxazole-3-carboxamide,
N-methyl-4H[1]benzopyrano[3,4-d]isoxazole-3-carboxamide,
8-methoxy-4H[1]benzopyrano[3,4-d]isoxazole-3-carboxamide,
N-benzyl-4H[1]benzopyrano[3,4-d]isoxazole-3-carboxamide,
3-pyrrolidinocarbonyl-8-chloro-4H[1]benzopyrano[3,4-d]isoxazole-3-carboxamide,
4H[1]benzopyrano[3,4-d]isoxazole-3-carboxhydrazide,
8-chloro-4H[1]benzopyrano[3,4-d]isoxazole-3-carboxhydrazide,
8-methyl-4H[1]benzopyrano[3,4-d)isoxazole-3-carboxhydrazide,
8-trifluoromethyl-4H[1]benzopyrano[3,4-d]isoxazole-3-carboxhydrazide,
7-methoxy-4H[1]benzopyrano[3,4-d]isoxazole-3-carboxhydrazide,
N-methyl-4H[1]benzopyrano[3,4-d]isoxazole-3-carboxhydrazide,
4H[1]benzopyrano[3,4-d]isoxazole-3-carboxylic acid, and
8-chloro-4H[1]benzopyrano[3,4-d]isoxazole-3-carboxylic acid.

The 4H[1]benzopyrano[3,4-d]isoxazole - 3 - carboxamides serve as convenient starting materials for the preparation of corresponding thiocarboxamides. In the preferred method, the carboxamide derivative is reacted with $P_2S_5$ in pyridine under reflux conditions.

The reaction may be illustrated as follows:

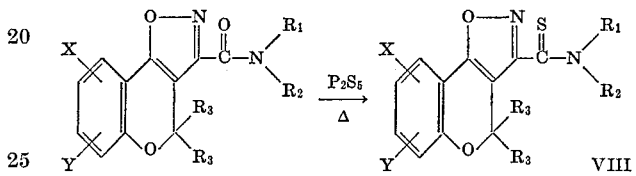

wherein all symbols are as previously described.

Representative of the compounds which may be prepared by the described process are 4H[1]benzopyrano[3,4-d]isoxazole-3-thiocarboxamide,
N-methyl-4H[1]benzopyrano[3,4-d]isoxazole-3-thiocarboxamide,
N,N-dimethyl-4H[1]benzopyrano[3,4-d]isoxazole-3-thiocarboxamide,
N-methyl-7-methoxy-4H[1]benzopyrano[3,4-d]isoxazole-3-thiocarboxamide,
N,N-dimethyl-8-trifluoromethyl-4H[1]benzopyrano[3,4-d]isoxazole-3-thiocarboxamide,
N-isopropyl-4H[1]benzopyrano[3,4-d]isoxazole-3-thiocarboxamide,
N-methyl-8-chloro-4H[1]benzopyrano[3,4-d]isoxazole-3-thiocarboxamide,
N,N-dimethyl-8-chloro-4H[1]benzopyrano[3,4-d]isoxazole-3-thiocarboxamide,
6-methoxy-4H[1]benzopyrano[3,4-d]isoxazole-3-thiocarboxamide, and
8-methoxy-4H[1]benzopyrano[3,4-d]isoxazole-3-thiocarboximide.

The 4H[1]benzopyrano[3,4-d]isoxazole - 3 - carboxamides thus obtained may be converted to the corresponding nitrile by treatment with thionyl chloride in dimethylformamide.

The process may be illustrated as follows:

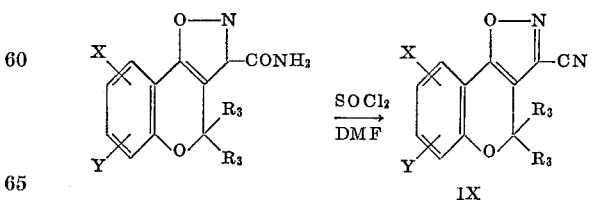

wherein $R_3$, X and Y are as previously defined and do not interfere with or partake in the reaction.

Representative of the compounds which may be prepared by the above process are:

4H[1]benzopyrano[3,4-d]isoxazole-3-carbonitrile,
8-chloro-4H[1]benzopyrano[3,4-d]isoxazole-3-carbonitrile, 6-methoxy-4H[1]benzopyrano[3,4-d]isoxazole-3-carbonitrile, and 7-methyl-4H[1]benzopyrano[3,4-d]isoxazole-3-carbonitrile.

The nitrile (VIII) serves as a convenient starting material for the preparation of the compounds in which Z is $$-\overset{A}{\underset{\|}{C}}-B.$$

For example, the nitrile may be treated with hydroxylamine in the presence of sodium methoxide to form the corresponding carboxamidoxime, or the nitrile may be treated with sodium methoxide in anhydrous methanol to form the carboximidate, or with ethanolic methylamine to form the corresponding carboxamidine.

These processes may be illustrated as follows:

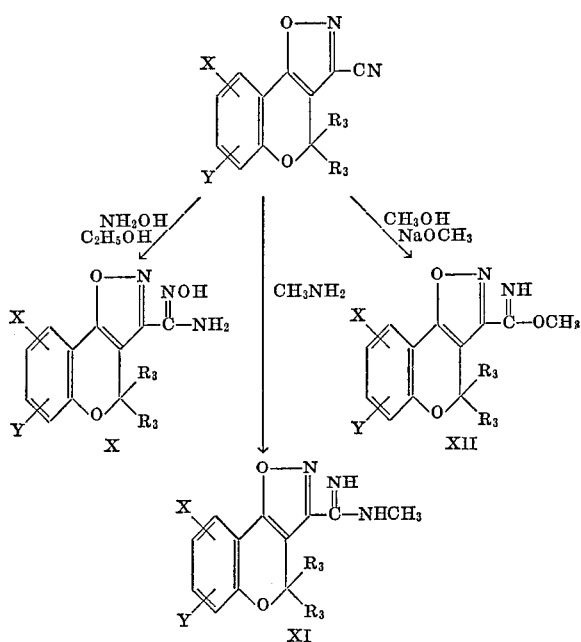

in which $R_3$, X and Y are as previously defined and do not interfere with or partake in the reactions.

Representative of the compounds which can be prepared by the above processes are 4H[1]benzopyrano[3,4-d]isoxazole-3-carboxamidoxime,
6-chloro-4H[1]benzopyrano[3,4-d]isoxazole-3-carboxamidoxime,
7-methyl-4H[1]benzopyrano[3,4-d]isoxazole-3-carboxamidoxime,
8-methoxy-N-methyl-4H[1]benzopyrano[3,4-d]isoxazole-3-carboxamidine,
N-methyl-6-chloro-4H[1]benzopyrano[3,4-d]isoxazole-3-carboxamidine,
N-methyl-7-methoxy-4H[1]benzopyrano[3,4-d]isoxazole-3-carboxamidine,
methyl 4H[1]benzopyrano[3,4-d]isoxazole-3-carboximidate,
methyl 6-chloro-4H[1]benzopyrano[3,4-d]isoxazole-3-carboximidate,
methyl 7-methyl-4H[1]benzopyrano[3,4-d]isoxazole-3-carboximidate, and
methyl 8-methoxy-4H[1]benzopyrano[3,4-d]isoxazole-3-carboximidate.

The corresponding imidazolinyl derivative may be prepared from the carboximidate derivative by treating it with ethylene diamine in methanol under reflux conditions.

The process may be illustrated as follows:

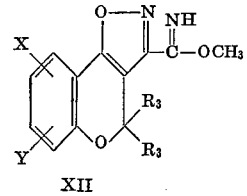

in which $R_3$, X and Y are as previously defined and do not interfere with or partake in the reactions.

Representative of the compounds which can be prepared by the above process are 3-(2-imidazolinyl)-4H[1]benzopyrano[3,4-d]isoxazole,
3-(2-imidazolinyl)-6-chloro-4H[1]benzopyrano[3,4-d]isoxazole,
3-(2-imidazolinyl)-7-methyl-4H[1]benzopyrano[3,4-d]isoxazole, and
3-(2-imidazolinyl)-8-methoxy-4H[1]benzopyrano-[3,4-d]isoxazole.

The compounds in which $n$ is larger than 1 may be prepared by treating the esters with lithium aluminum hydride to form the corresponding alcohol. The alcohol is then treated with tosyl chloride in a suitable solvent such as pyridine to form the tosylate. The tosylate is then treated with sodium cyanide to form the next higher nitrile which can be used as a starting material in the previously described processes or esterified and employed to prepare the next higher derivatives. If desired, the tosylate may be treated with an amine to form the desired amine derivatives.

The described processes may be illustrated as follows:

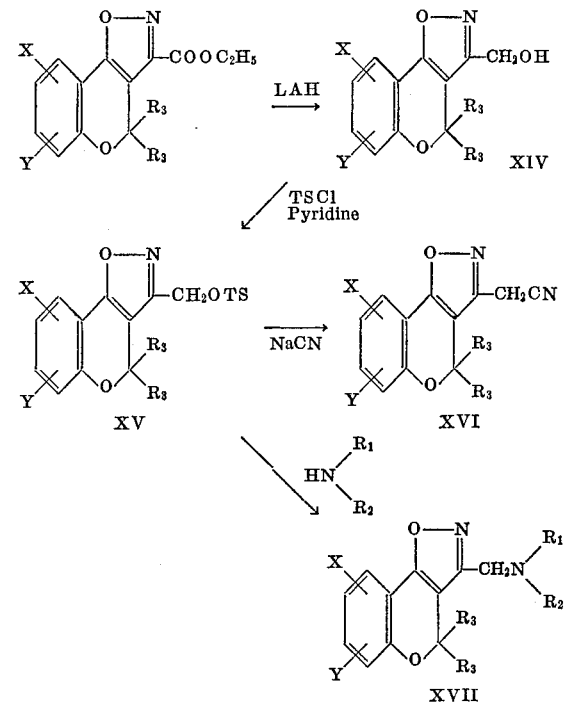

in which all symbols are as previously described and do not partake in or interfere with the reaction.

Acid addition salts of the compounds of the present invention capable of forming such salts may be conveniently produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds capable of forming such salts with a suitable alkylating agent such as dimethyl sulfate, or an alkyl halide such as methyl chloride, methyl iodide or ethyl bromide.

The compounds of the present invention possess central nervous system depressant and anti-inflammatory activity. The compounds ethyl 4H[1]benzopyrano[3,4-d]isoxazole-3-carboxylate and 4H[1]benzopyrano[3,4-d]isoxazole-3-carboxamide have been shown at oral doses of 20 mg./kg. b.i.d. to reduce the edema and inflammatory response which occurs when *M. butyricum* is injected into a rat to experimentally induce mycobacterial adjuvant arthritis. In evaluating the compounds, oral doses of 20 mg./kg. were administered twice a day for four days beginning 11 days after the injection of a 0.5% suspension of *M. butyricum* in a light mineral oil base into the plantar surface of the right hind foot of the rat. The volume of each hind foot of the rat was determined by mercury displacement immediately following the injection and 11 and 15 days after the injection. In the animals which were treated with the compounds, the volume of the injected foot decreased substantially as compared to the controls indicating an anti-inflammatory action attributable to the compounds.

The compounds of the invention are also useful as intermediates in the preparation of structurally related pharmaceutical agents. In addition, the thiocyanic acid addition salts of the compounds of this invention, when condensed with formaldehyde, form resinous materials useful as pickling agents according to U.S. Pats. 2,425,320 and 2,606,155. The compounds also form fluosilicic acid addition salts which are useful as mothproofing agents according to U.S. Pats. 1,915,334 and 2,075,359.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or propylene glycol.

The unit dosage forms may contain a concentration of 0.1% to 10% or more by weight of one or more of the novel compounds. Generally, such dosage forms will contain about 5 to 150 mg. of the active ingredients.

The following examples are presented to illustrate this invention:

EXAMPLE 1

Ethyl 4-oxochroman-3-glyoxylate

A mixture of 74 g. (0.5 mole) of 4-chromanone and 146 g. (1.0 mole) of ethyl oxalate in 375 ml. of anhydrous toluene is added dropwise over 1.25 hours to a suspension of sodium hydride (from 54.4 g. of a 53.3% oil-hydride mixture) in 1 liter of anhydrous toluene under an atmosphere of nitrogen. After stirring at room temperature overnight the reaction mixture is added to 1 kg. of ice and stirred 1 hour. The aqueous layer is separated and the organic phase extracted with five 250 ml. portions of $H_2O$. Acidification of the combined extracts with 75 ml. of concentrated hydrochloric acid gives a precipitate of 115.6 g. (94%) of bright yellow solid. Recrystallization from 200 ml. of ethanol gives the ethyl 4-oxochroman-3-glyoxylate, m.p. 72–79°.

*Analysis.*—Calcd. for $C_{13}H_{12}O_5$: C, 62.90; H, 4.87. Found: C, 62.68; H, 5.03.

EXAMPLE 2

Ethyl 4H[1]benzopyrano[3,4-d]isoxazole-3-carboxylate

A mixture of 99.2 g. (0.4 mole) of ethyl 4-oxochroman-3-glyoxylate, 29.6 g. (0.425 mole) of hydroxylaminehydrochloride and 800 ml. of ethanol are refluxed for 18 hours, 200 ml. of solvent distilled and the residue cooled to give the isoxazole, m.p. 88–92°. Recrystallization from cyclohexane provides the pure ester, ethyl 4H[1]benzopyrano[3,4-d]isoxazole-3-carboxylate, m.p. 90–92°.

*Analysis.*—Calcd. for $C_{13}H_{11}NO_4$: C, 63.68; H, 4.53; N, 5.71. Found: C, 63.92; H, 4.67; N, 5.56.

EXAMPLE 3

4H[1]benzopyrano[3,4-d]isoxazole-3-carboxylic acid

A solution of 4.9 g. (0.02 mole) of ethyl 4H[1]benzopyrano[3,4-d]isoxazole-3-carboxylate in 25 ml. of warm ethanol is treated with a solution of 1.5 g. of potassium hydroxide in 25 ml. of ethanol. The precipitate, which forms immediately, is washed with ethanol and dried to give the potassium salt. Treatment of the salt with dilute hydrochloric acid for 5–10 minutes on a steam bath gives the acid, 4H[1]benzopyrano[3,4-d]isoxazole-3-carboxylic acid, m.p. 187.5°, after recrystallization from isopropanol.

*Analysis.*—Calcd. for $C_{11}H_7NO_4$: C, 60.83; H, 3.25; N, 6.45. Found: C, 60.69; H, 3.09; N, 6.64.

EXAMPLE 4

4H[1]benzopyrano[3,4-d]isoxazole-3-carboxamide

A solution of 83.9 g. (0.34 mole) of ethyl 4H[1]benzopyrano[3,4-d]isoxazole-3-carboxylate in 850 ml. of warm alcohol is treated with 250 ml. of concentrated aqueous ammonia and the precipitate filtered after 2 hours to give the 4H[1]benzopyrano[3,4 - d]isoxazole-3-carboxamide, m.p. 233–236°.

*Analysis.*—Calcd. for $C_{11}H_8N_2O_3$: C, 61.11; H, 3.73; N, 12.95. Found: C, 60.93; H, 3.95; N, 12.52.

EXAMPLE 5

4H[1]benzopyrano[3,4-d]isoxazole-3-carbonitrile

A solution of 70.7 g. (0.327 mole) of 4H[1]benzopyrano[3,4-d]isoxazole-3-carboxamide in 650 ml. of dimethylformamide at 60° is treated dropwise over 20 minutes with 48.6 g. (0.4 mole) of thionyl chloride. The addition is slightly exothermic and is maintained at 55–63° without external heat. After stirring 5 hours at 60° and at room temperature overnight the mixture is poured into several liters of water and the solids filtered and dried. Recrystallization from one liter of cyclohexane gives 4H[1]benzopyrano[3,4 - d]isoxazole-3-carbonitrile, m.p. 127–131°. An analytical sample prepared by recrystallization from methanol melts at 132–134°.

*Analysis.*—Calcd. for $C_{11}H_6N_2O_2$: C, 66.66; H, 3.05; N, 14.13. Found: C, 66.79; H, 2.96; N, 14.03.

EXAMPLE 6

4H[1]benzopyrano[3,4-d]isoxazole-3-carboxhydrazide

A stirred solution of 16.8 g. (0.069 mole) of ethyl 4H[1]benzopyrano[3,4-d]isoxazole-3-carboxylate in 250 ml. of warm ethanol is treated all at once with a solution of 27.6 g. (0.069 mole) of hydrazine hydrate in 100 ml. of ethanol. After heating gently on the steam bath for 30 minutes, the mixture is cooled and the solids filtered to give 4H[1]benzopyrano[3,4-d]isoxazole-3-carboxhydrazide, m.p. 197–199°. A sample recrystallized from isopropanol melts at 195°.

*Analysis.*—Calcd. for $C_{11}H_8N_3O_3$: C, 57.14; H, 3.93; N, 18.18. Found: C, 56.83; H, 3.71; N, 18.05.

EXAMPLE 7

3-(2-imidazolinyl)-4H[1]benzopyrano[3,4-d]isoxazole

A mixture of 4.6 g. (0.022 mole) of methyl 4H[1]benzopyrano[3,4-d]isoxazole - 3 - carboximidate, 4.8 g.

(0.08 mole) of ethylenediamine and 50 ml. of methanol is heated to reflux. A solution forms after 15 minutes and subsequent precipitation occurs in 1.5 hours. After 3.5 hours, the hot mixture is filtered to give 2.8 g. of the product, m.p. 209–211°. Recrystallization from benzene and then from carbon tetrachloride gives 3-(2-imidazolinyl)-4H[1]benzopyrano[3,4-d]isoxazole, m.p. 216–217° and a second crop, m.p. 213–215°.

*Analysis.*—Calcd. for $C_{13}H_{11}N_3O_2$: C, 64.72; H, 4.60; N, 17.42. Found: C, 65.18; H, 4.72; N, 17.45.

EXAMPLE 8

Methyl 4H[1]benzopyrano[3,4-d]isoxazole-3-carboximidate

A mixture of 20.0 g. (0.11 mole) of 4H[1]benzopyrano[3,4-d]isoxazole-3-carbonitrile in 250 ml. of anhydrous methanol (distilled from Mg) and 0.5 g. of $NaOCH_3$ is stirred magnetically in a stoppered flask. The mixture appears to thicken soon after mixing and after 1 hour thin layer chromatography (silica-ethyl acetate) indicates virtual disappearance of the nitrile. After standing overnight the solvent is removed from the reaction mixture and the residue recrystalized from 500 ml. of cyclohexane to give methyl 4H[1]benzopyrano[3,4-d]isoxazole-3-carboximidate, m.p. 122–124°. A sample prepared by recrystallization of the compound from isopropanol had a melting point of 124–126°.

*Analysis.*—Calcd. for $C_{12}H_{10}N_2O_3$: C, 62.21; H, 4.38; N, 12.17. Found: C, 62.52; H, 4.30; N, 12.20.

EXAMPLE 9

Ethyl 6-chloro-4-oxochroman-3-glyoxylate

A suspension of NaH (from 41.0 g. of 59% in oil) in 1 liter of dry toluene is stirred in a 5 liter flask, in an atmosphere of nitrogen. Thirty percent of a solution of 85.3 g. (0.5 M) of diethyl oxalate, diluted to 500 ml. with toluene, is added over a period of several hours along with 1.0 ml. of ethanol and the mixture is stirred for 6 hours. A vigorous evolution of gas occurs and the reaction is moderated by cooling with an ice bath. The remainder of the toluene solution is added and stirring continued overnight. An additional 500 ml. of toluene is added to thin out the reaction mixture. The reaction mixture is then filtered and the filter cake suspended in several portions of ether and filtered. This material is stirred with a mixture of dilute HCl and ether until two clear layers are formed. The ether layer is separated and the aqueous phase extracted with ether. The ether is removed from the combined extracts and the residue recrystallized from 500 ml. of ethanol to give ethyl 6-chloro-4-oxochroman-3-glyoxylate in the form of bright yellow crystals, m.p. 86–88°.

*Analysis.*—Calcd. for $C_{13}H_{11}ClO_5$: C, 55.23; H, 3.92; Cl, 12.54. Found: C, 55.56; H, 4.03; Cl, 12.48.

EXAMPLE 10

Ethyl 8-chloro-4H[1]benzopyrano[3,4-d]isoxazole-3-carboxylate

A mixture of 42.0 g. (0.149 M) of glyoxylate of the preceding example, 10.4 g. (0.164 M) of hydroxylamine hydrochloride and 150 ml. of ethanol is refluxed for 21 hours and cooled to give ethyl 8-chloro-4H[1]benzopyrano[3,4-d]isoxazole-3-carboxylate as white crystals, m.p. 108–109°. Recrystallization from cyclohexane raises the melting point to 109–111°.

*Analysis.*—Calcd. for $C_{13}H_{10}ClNo_4$: C, 55.84; H, 3.60; N, 5.00; Cl, 12.67. Found: C, 55.78; H, 3.46; N, 4.89; Cl, 12.64.

EXAMPLE 11

N-methyl-8-chloro-4H[1]benzopyrano[3,4-d]isoxazole-3-carboxamide

A warm solution of 7.0 g. (0.025 mole) of ethyl 8-chloro-4H[1]benzopyrano[3,4-d]isoxazole - 3 - carboxylate in 150 ml. of ethanol is treated with a stream of anhydrous methylamine for 45 minutes. At this time thin layer chromatography (silica, benzene-ethyl acetate 4:1) indicates disappearance of the ester. After standing overnight at room temperature the solids present are filtered to give N-methyl - 8 - chloro-4H[1]benzopyrano[3,4-d]isoxazole-3-carboxamide, m.p. 189–191°. Recrystallization from 30 parts of acetonitrile gives an analytical sample, m.p. 190–92°.

*Analysis.*—Calcd. for $C_{12}H_9ClN_2O_3$: C, 54.44; H, 3.43; Cl, 13.40; N, 10.58. Found: C, 54.81; H, 3.59; Cl, 13.39; N, 10.35.

EXAMPLE 12

N,N-dimethyl-8-chloro-4H[1]benzopyrano[3,4-d]isoxazole-3-carboxamide

A solution of ethyl 8-chloro-4H[1]benzopyrano[3,4-d]isoxazole-3-carboxylate (10.0 g., 0.036 mole) in 220 ml. of warm ethanol is treated with a steady stream of anhydrous dimethylamine for 2.5 hours at which time precipitation occurs. The solids are filtered and air-dried to give N,N-dimethyl - 8 - chloro - 4H[1]benzopyrano[3,4-d]isoxazole-3-carboxamide, m.p. 175–180°. Recrystallization from isopropanol raises the melting point to 179–181°.

*Analysis.*—Calcd. for $C_{13}H_{11}ClN_2O_3$: C, 56.02; H, 3.98; Cl, 12.72; N, 10.05. Found: C, 56.25; H, 4.17; Cl, 12.72; N, 10.08.

EXAMPLE 13

6-methoxy-4H[1]benzopyrano[3,4-d]isoxazole-3-carboxamide

A solution of NaOEt prepared from 8.7 g. (0.377 mole) of Na and 350 ml. of ethanol is cooled in ice and treated rapidly dropwise with a mixture of 42.4 g. (0.29 mole) of freshly distilled diethyl oxalate (b.p. 65–66°/8 mm.) and 51.8 g. (0.29 mole) of 8-methoxy-4-chromanone. After stirring at room temperature overnight the mixture is poured into 580 ml. of water and 30 ml. of concentrated HCl. The oil which forms is extracted into ether and dried over $CaCl_2$. Removal of the solvent leaves 80 g. of oil which could not be obtained in a solid form. It is dissolved in 290 ml. of ethanol and refluxed for 3 hours with 24.2 g. (0.35 mole) of hydroxylamine hydrochloride. Addition of 75 ml. of water gives a precipitate which is filtered, slurried in methanol and filtered to give 6 - methoxy - 4H[1]benzopyrano[3,4-d]isoxazole - 3 - carboxamide, m.p. 220–226°. Recrystallization from 700 ml. of methanol with the aid of charcoal raises the melting point to 227–228°.

*Analysis.*—Calcd. for $C_{12}H_{10}N_2O_4$: C, 58.54; H, 4.09; N, 11.38. Found: C, 58.26; H, 3.71; N, 11.17.

EXAMPLE 14

N-methyl-4H[1]benzopyrano[3,4-d]isoxazole-3-carboxamide

A solution of 23.1 g. (0.1 mole) of ethyl 4H[1]benzopyrano[3,4-d]isoxazole - 3 - carboxylate in 600 ml. of warm ethanol is heated with a moderate stream of methylamine for 45 minutes. Precipitation occurs after 20 minutes. The mixture is cooled, the solids filtered, and dried at 60° to give N - methyl - 4H[1]benzopyrano[3,4-d]isoxazole-3-carboxamide, m.p. 166–169°. Concentration gives another portion, m.p. 166–169°. A 3.0 g. portion recrystallized from 105 ml. of acetonitrile gives a purified sample, m.p. 167–170°.

*Analysis.*—Calcd. for $C_{12}H_{10}N_2O_3$: C, 62.60; H, 4.37; N, 12.17. Found: C, 62.40; H, 4.13; N, 11.65.

EXAMPLE 15

N-methyl-4H[1]benzopyrano[3,4-d]isoxazole-3-thiocarboxamide

A mixture of 18.3 g. (0.08 mole) of N-methyl-4H[1]benzopyrano[3,4-d]isoxazole - 3 - carboxamide, 19.5 g. (0.088 mole) of $P_2S_5$ and 150 ml. of pyridine is refluxed for 1 hour, cooled, and poured cautiously on ice. The solids are filtered and air-dried to give N-methyl-4H[1]

benzopyrano[3,4-d]isoxazole - 3 - thiocarboxamide, m.p. 183–185°. Recrystallization from 300 ml. of acetonitrile raises the melting point to 184–186°. A sample for analysis is recrystallized from 50 parts of *i*-propanol, m.p. 185–187°.

*Analysis.*—Calcd. for $C_{12}H_{10}N_2SO_2$: C, 58.54; H, 4.09; N, 11.38. Found: C, 58.35; H, 4.35; N, 11.06.

EXAMPLE 16

Ethyl 8-methoxy-4H[1]benzopyrano[3,4-d]isoxazole-3-carboxylate

A mixture of 47.3 g. (0.17 mole) of ethyl 6-methoxy-4-oxochroman-3-glyoxylate, 13.0 g. (0.19 mole) of hydroxylamine hydrochloride and 170 ml. of ethanol is refluxed for 1 hour, cooled in an ice bath and filtered. The solids are rinsed with ethanol to give ethyl 8-methoxy-4H[1]benzopyrano[3,4-d]isoxazole - 3 - carboxylate, m.p. 137–139°.

*Analysis.*—Calcd. for $C_{14}H_{13}NO_5$: C, 61.09; H, 4.76; N, 5.09. Found: C, 60.90; H, 4.80; N, 5.13.

EXAMPLE 17

4H[1]benzopyrano[3,4-d]isoxazolyl-3-carbohydroxamic acid

A solution of 2.8 g. (0.04 mole) of hydroxylamine hydrochloride in 50 ml. of methanol is mixed with a solution of 4.9 g. (0.09 mole) of NoOMe in 75 ml. of methanol. The NaCl is filtered and the filtrate added to a mixture of 6.9 g. (0.03 mole) of methyl 4H[1]benzopyrano[3,4-d]isoxazole-3-carboxylate in 75 ml. of methanol and the mixture refluxed for 3 hours. The solids are filtered, rinsed with methanol and stirred with dilute HCl to give 4H[1]benzopyrano[3,4-d]isoxazolyl - 3-carbohydroxamic acid, m.p. 208–210°. Recrystallization from 75 parts of acetonitrile raises the melting point to 214–216°.

*Analysis.*—Calcd. for $C_{11}H_8N_2O_4$: C, 56.89; H, 3.47; N, 12.07. Found: C, 56.81; H, 3.26; N, 12.20.

EXAMPLE 18

Ethyl 6-methoxychroman-4-one-3-glyoxylate

A mixture of 53.4 g. (0.3 mole) of 6-methoxychromanone and 43.8 g. (0.3 mole) of diethyl oxalate is added dropwise to a suspension of NaH (from 30.4 g., 0.66 mole of a 50% suspension in oil) in 2.25 liters of benzene containing 1 ml. of ethanol. After stirring overnight the mixture is poured, in portions, into a mixture of 100 ml. of concentrated HCl and 900 ml. of water. Stirring is continued until the red color disappears and the organic layer is a deep yellow. The layers are separated, the aqueous layer washed with benzene and the organic phases dried over $Na_2SO_4$. The solvent is removed and the residue triturated with cold *n*-heptane. The solids are filtered and recrystallized from 250 ml. of methylcyclohexane to give 6-methoxychroman-4-one-3-glyoxylate, m.p. 84–86°. A sample is recrystallized from methylcyclohexane, m.p. 83.5–85.5°.

*Analysis.*—Calcd. for $C_{14}H_{14}O_6$: C, 60.43; H, 5.07. Found: C, 60.54; H, 4.78.

EXAMPLE 19

8-methoxy-4H[1]benzopyrano[3,4-d]isoxazole-3-carboxamide

Ethyl 8 - methoxy-4H[1]benzopyrano[3,4-d]isoxazole-3-carboxylate (46 g., 0.165 mole) is added to 85 ml. of ammonia-saturated methanol followed by 85 ml. of ethylene glycol. After stirring for 24 hours, the solids are filtered, rinsed with water, methanol and then chloroform and dried to give 8 - methoxy-4H[1]benzopyrano[3,4-d]isoxazole-3-carboxamide, m.p. 241–245°.

A sample recrystallized from 230 parts of acetonitrile had m.p. 245–247°.

*Analysis.*—Calcd. for $C_{12}H_{10}N_2O_4$: C, 58.54; H, 4.09; N, 11.38. Found: C, 58.68; H, 3.99; N, 11.27.

EXAMPLE 20

2-hydroxyethyl 8-methoxy-4H[1]benzopyrano[3,4-d]isoxazole-3-carboxylate

A suspension of 26.0 g. (0.096 mole) of ethyl 8-methoxy - 4H[1]benzopyrano[3,4-d]-isoxazole - 3 - carboxylate in 130 ml. of ethylene glycol at 95° is treated with a stream of ammonia for 0.5 hours. Thin layer chromatography (silica-$CHCl_3$) indicates an absence of starting material. Water (130 ml.) is added and the solids filtered and dried. By warming on the steambath with 200 ml. of acetonitrile, most of the solids are dissolved. Insoluble material (a small amount of amide) is filtered and the filtrate concentrated to 150 ml. to give 2-hydroxyethyl 8 - methoxy - 4H[1]benzopyrano[3,4-d]isoxazole-3-carboxylate, m.p. 130–137°. Recrystallization from ethanol raises the melting point to 133–135°.

*Analysis.*—Calcd. for $C_{14}H_{13}NO_6$: C, 57.73; H, 4.50; N, 4.81. Found: C, 57.83; H, 4.41; N, 4.82.

EXAMPLE 21

Methyl 8-methoxy-4H[1]benzopyrano[3,4-d]isoxazole-3-carboximidate

A mixture of 11.4 g. (0.05 mole) of nitrile, 50 mg. of NaOMe and 250 ml. of methanol is stirred at room temperature for 4 hours and filtered to give the imino ester, m.p. 137–139°. A second crop of imino ester, m.p. 137–138° is obtained on concentration. Recrystallization from 75 ml. of acetonitrile gives methyl 8 - methoxy-4H[1]benzopyrano[3,4-d]isoxazole-3-carboximidate, m.p. 137–139°.

*Analysis.*—Calcd. for $C_{13}H_{12}N_2O_4$: C, 59.98; H, 4.64; N, 10.77. Found: C, 59.84; H, 4.75; N, 10.76.

EXAMPLE 22

8-methoxy-4H[1]benzopyrano[3,4-d]isoxazole-3-carbohydroxamic acid

A solution of 1.4 g. (0.02 mole) of $NH_2OH \cdot HCl$ in 25 ml. of methanol is treated with a solution of 2.2 g. (0.04 mole) of NaOMe in 25 ml. of methanol. The NaCl is filtered and the filtrate added dropwise to 4.1 g. (0.015 mole) of the ethyl ester in 75 ml. of refluxing methanol. After 15 minutes of reflux and 15 minutes at room temperature, the solids are filtered, stirred with dilute HCl and filtered to give 8-methoxy-4H[1]benzopyrano[3,4-d]isoxazole - 3-carbohydroxamic acid, m.p. 200–202°. Recrystallization from 150 parts of acetonitrile (with charcoal) raises the melting point to 203–205°.

*Analysis.*—Calcd. for $C_{12}H_{10}N_2O_5$: C, 54.96; H, 3.84; N, 10.68. Found: C, 55.13; H, 3.94; N, 10.69.

EXAMPLE 23

4H[1]benzopyrano[3,4-d]isoxazole-3-acetonitrile

Sodium cyanide (9.8 g., 0.2 mole) is added all at once to a solution of 35.7 g. (0.1 mole) of 4H[1]benzopyrano[3,4-d]isoxazole-3-methyl tosylate in 225 ml. of dry dimethyl sulfoxide. The mixture becomes slightly warm and it is cooled with cold water. After 0.5 hours thin layer chromatography indicates absence of tosylate. The solution is poured into 2 liters of water and extracted with 3× 500 ml. of benzene. The benzene extracts are washed with 2× 250 ml. of water and 250 ml. of saturated NaCl. After filtering through $CaCl_2$ the benzene is removed and the residue boiled with 500 ml. of methylcyclohexane. Cooling gives 4H[1]benzopyrano[3,4-d]isoxazole-3-acetonitrile, m.p. 103–105°. A sample recrystallized from 10 parts of isopropanol has a melting point of 105–107°.

*Analysis.*—Calcd. for $C_{12}H_8N_2O_2$: C, 67.92; H, 3.80; N, 13.21. Found: C, 68.12; H, 3.68; N, 13.36.

EXAMPLE 24

Methyl-4H[1]benzopyrano[3,4-d]isoxazole-3-carboxylate

The glyoxylate of Example 1 is refluxed for 3 hours with 1.19 liters of methanol containing 90.8 g. (1.31 moles) of NH$_2$OH.HCl. After cooling to room temperature, 600 ml. of water is added and the solids filtered and dried to give methyl-4H[1]benzopyrano[3,4-d]isoxazole-3-carboxylate, m.p. 136–139°.

EXAMPLE 25

4H[1]benzopyrano[3,4-d]isoxazole-3-carboxamide

The ester of Example 24 is stirred for 22 hours with a mixture of 500 ml. of saturated methanolic ammonia and 500 ml. of ethylene glycol. Water (1.3 liters) is added, the solids filtered, air dried, rinsed with methanol and dried to give 4H[1]benzopyrano[3,4-d]isoxazole-3-carboxamide, m.p. 235–237°.

EXAMPLE 26

4H[1]benzopyrano[3,4-d]isoxazole-3-methanol tosylate

A mixture of 3.90 g. (0.0192 mole) of 4H[1]benzopyrano[3,4-d]isoxazole-3-methanol, 0.84 g. (0.0192 mole) of 55% NaH/oil, and 90 ml. of benzene is stirred at room temperature for 1 hour, cooled in ice, and a solution of 3.9 g. (0.0205 mole) of tosyl chloride in 10 ml. of dry benzene added dropwise. After stirring overnight, 20 ml. of water is added, the layers separated, and the benzene layer washed with 10% K$_2$CO$_3$ and then water. After drying over MgSO$_4$, the benzene is removed and the residue dissolved in 50 ml. of hot CCl$_4$. Cooling gives 5.9 g. of 4H[1]benzopyrano[3,4-d]isoxazole-3-methanol tosylate, m.p. 106–108°.

*Analysis.*—Calcd. for C$_{18}$H$_{15}$NO$_5$S: C, 60.49; H, 4.23; N, 3.92. Found: C, 60.59; H, 4.19; N, 4.07.

EXAMPLE 27

3-piperidinomethyl-4H[1]benzopyrano[3,4-d]isoxazole

A mixture of 5.36 g. (0.015 mole) of the tosylate of Example 26, 2.5 g. (0.03 mole) of freshly distilled piperidine and 70 ml. of dry benzene is refluxed for 2 hours, cooled, and washed with 25 ml. of water and three 25 ml. portions of 3$N$ HCl. Treatment of the extracts with 10% NaOH gives 3 - piperidinomethyl - 4H[1]benzopyrano[3,4-d] isoxazole, m.p. 102–104°.

*Analysis.*—Calcd. for C$_{16}$H$_{18}$N$_2$O$_2$: C, 71.09; H, 6.72; N, 10.34. Found: C, 70.90; H, 6.79; N, 10.18.

EXAMPLE 28

3-(4-methylpiperazinomethyl)-4H[1]benzopyrano[3,4-d]isoxazole

A solution of 5.36 g. (0.15 mole) of the tosylate of Example 26 in 70 ml. of dry benzene is added dropwise to a solution of 3.0 g. (0.03 mole) of freshly distilled N-methylpiperazine in 30 ml. of dry benzene. After 2 hours at reflux, thin layer chromatography indicates an absence of tosylate. The solution is then cooled and shaken with three 25 ml. portions of 3$N$ HCl. Some solids insoluble in both phases are separated. These are filtered and the aqueous extracts made basic with 10% NaOH. These solids are filtered to give 0.72 g., m.p. 100–103°. The solids insoluble in both phases are dissolved in methanol, and the solution treated with dilute NaOH to give another 0.6 g. of the desired product, m.p. 102–104°. The two fractions are combined and chromatographed on 100 g. of alumina, eluted with CHCl$_3$, and the amine (3.0 g.) recrystallized from 35 ml. of methylcyclohexane to give 3 - (4 - methylpiperazinomethyl)-4H[1]benzopyrano[3,4-d]isoxazole, m.p. 92–92.5°.

*Analysis.*—Calcd. for C$_{16}$H$_{19}$N$_3$O$_2$: C, 67.35; H, 6.72; N, 14.73. Found: C, 67.39; H, 6.57; N, 14.71.

EXAMPLE 29

3-morpholinomethyl-4H[1]benzopyrano[3,4-d]isoxazole

4H[1]benzopyrano[3,4-d]isoxazole - 3-methyl tosylate (5.36 g., 0.015 mole) in 70 ml. of benzene is added dropwise to a solution of 2.61 g. (0.03 mole) of morpholine in 5 ml. of benzene. The mixture is refluxed for 2 hours, cooled and extracted three times with 25 ml. 3$N$ HCl. Insoluble solids form which are filtered, dissolved in MeOH, and the solution is made basic with NaOH. The crude amine, m.p. 94–96°, is combined with material isolated by treating the acidic filtrates with NaOH. The amine is chromatographed on 100 g. silica with benzene to give 3 - morpholinomethyl-4H[1]benzopyrano[3,4-d] isoxazole, m.p. 94–95°.

*Analysis.*—Calcd. for C$_{15}$H$_{16}$N$_2$O$_3$: C, 66.17; H, 5.92; N, 10.29. Found: C, 66.57; H, 6.02; N, 10.25.

EXAMPLE 30

1-(4H[1]benzopyrano[3,4-d]isoxazole-3-carbonyl)piperidine

A mixture of 4.6 g. (0.02 mole) of methyl-4H[1]benzopyrano[3,4-d]isoxazole-3-carboxylate, 3.4 g. (0.04 mole) of redistilled piperidine, 50 ml. of NaOMe, and 50 ml. of methanol is refluxed for 5 hours, cooled, and poured into 400 ml. of water. The solids are filtered to give 4.1 g., m.p. 100–102°. Recrystallization from 40 ml. of cyclohexane gives 1-(4H[1]benzopyrano[3,4-d]isoxazole-3-carbonyl)piperidine, m.p. 99–101°.

*Analysis.*—Calcd. for C$_{16}$H$_{16}$N$_2$O$_3$: C, 67.59; H, 5.68; N, 9.85. Found: C, 67.97; H, 5.56; N, 9.64.

EXAMPLE 31

1-(4H[1]benzopyrano[3,4-d]isoxazole-3-carbonyl)-4-phenylpiperazine

A mixture of 4.6 g. (0.02 mole) of methyl-4H[1]benzopyrano[3,4-d]isoxazole-3-carboxylate, 6.5 g. (0.04 mole) of N-phenylpiperazine, 0.05 g. of NaOMe, and 50 ml. of methanol is refluxed for 6 hours, cooled to room temperature and diluted with 500 ml. of water. The solids are filtered, dried, and recrystallized from 350 ml. of MeCN to give 1-(4H[1]benzopyrano[3,4-d]isoxazole - 3 - carbonyl)-4-phenylpiperazine, m.p. 177°.

*Analysis.*—Calcd. for C$_{21}$H$_{19}$N$_3$O$_3$: C, 69.79; H, 5.30; N, 11.63. Found: C, 69.32; H, 5.12; N, 11.44.

EXAMPLE 32

1-(4H[1]benzopyrano[3,4-d]isoxazole-3-carbonyl)-4-methylpiperazine

A mixture of 2.3 g. (0.01 mole) methyl-4H[1]benzopyrano[3,4-d]isoxazole-3-carboxylic acid, 2.0 g. (0.02 mole) N-methylpiperazine, 25 mg. of sodium methoxide, and 25 ml. of ethanol is refluxed for 5 hours, cooled and poured into 200 ml. of water. The solids are filtered and recrystallized from cyclohexane to obtain 1-(4H[1]benzopyrano[3,4-d]isoxazole - 3-carbonyl)-4-methylpiperazine, m.p. 106–107°.

*Analysis.*—Calcd. for C$_{16}$H$_{17}$N$_3$O$_3$: C, 64.20; H, 5.72; N, 14.04. Found: C, 64.40; H, 5.73; N, 13.95.

I claim:

1. A compound of the formula

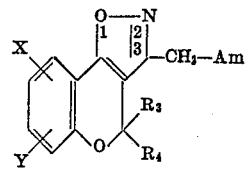

or a pharmaceutically acceptable acid addition salt thereof, in which X and Y are selected from hydrogen, halo, lower alkyl of 1 to 4 carbon atoms, lower alkoxy and trifluoromethyl, and Am is a cyclicamino group selected from morpholino, pyrrolidino, piperidino, 4-lower alkyl-1-piperazino, N-phenyl-lower alkyl piperazino, N-hydroxy-lower alkyl piperazino, and $R_3$ and $R_4$ are selected from hydrogen, lower alkyl of 1 to 4 carbon atoms and phenyl.

References Cited

UNITED STATES PATENTS 3,553,230   1/1971   Freedman _____ 260—307

G. THOMAS TODD, Primary Examiner

U.S. Cl. X.R.

260—247.1, 268 TR, 293.58, 307 H, 345.2; 424—248, 250, 263, 269